United States Patent
Toda et al.

(10) Patent No.: US 8,668,218 B2
(45) Date of Patent: Mar. 11, 2014

(54) VEHICLE BODY FRAME OF MOTORCYCLE

(75) Inventors: Munehiro Toda, Wako (JP); Akira Hosono, Wako (JP); Ryo Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 13/369,796

(22) Filed: Feb. 9, 2012

(65) Prior Publication Data

US 2012/0205890 A1 Aug. 16, 2012

(30) Foreign Application Priority Data

Feb. 14, 2011 (JP) ................................. 2011-028735

(51) Int. Cl.
*B62K 19/00* (2006.01)

(52) U.S. Cl.
USPC .......................... 280/281.1; 180/219; 280/274

(58) Field of Classification Search
USPC ......... 180/219, 220, 226, 227, 228, 229, 230; 280/274, 280, 281.1
See application file for complete search history.

(56) References Cited

U.S. PATENT DOCUMENTS

| 6,481,522 | B1 | 11/2002 | Adachi |
| 7,677,346 | B2 * | 3/2010 | Suzuki .......................... 180/219 |
| 7,694,985 | B2 * | 4/2010 | Hoshi ............................ 280/274 |
| 8,104,565 | B2 * | 1/2012 | Miyashiro et al. ............ 180/311 |
| 8,272,656 | B2 * | 9/2012 | Katsura ......................... 280/279 |
| 2008/0258422 | A1 | 10/2008 | Suzuki |

FOREIGN PATENT DOCUMENTS

JP 2007-8434 A 1/2007

* cited by examiner

*Primary Examiner* — Kevin Hurley
*Assistant Examiner* — Marc A Scharich
(74) *Attorney, Agent, or Firm* — Birch, Stewart, Kolach & Birch, LLP

(57) ABSTRACT

A head pipe includes a pipe portion and a bracket portion contiguously formed on a rear portion of the pipe portion wherein front end portions of the main frames and a front end portion of the down frame are jointed to the bracket portion. A widthwise center line of the main frames in the vertical direction is directed toward an intermediate portion of the pipe portion in the vertical direction in a side view. An upper surface extension line and a lower surface extension line on the extension in the frontward direction of an upper surface and a lower surface of the main frames pass between an upper end and a lower end of the pipe portion as viewed in a side view. The down frame is inclined to be directed towards the intermediate portion of the pipe portion in the vertical direction as viewed in a side view.

20 Claims, 5 Drawing Sheets

VEHICLE BODY FRAME OF MOTORCYCLE

CROSS-REFERENCE TO RELATED APPLICATIONS

The present application claims priority under 35 USC 119 to Japanese Patent Application No. 2011-028735 filed on Feb. 14, 2010 the entire contents of which are hereby incorporated by reference.

BACKGROUND OF THE INVENTION

1. Field of the Invention

The present invention relates to a vehicle body frame for a motorcycle which includes a head pipe for steerably supporting a front fork which pivotally supports a front wheel and a steering handle. A pair of left and right main frames extends rearwardly and downwardly from the head pipe with a down frame extending rearwardly and downwardly from the head pipe at an angle steeper than an angle at which the main frames extend rearwardly and downwardly.

2. Description of Background Art

A vehicle body frame for a motorcycle is disclosed in JP-A-2007-8434. In this body frame structure, front end portions of the main frames are joined to an upper portion of the head pipe, and a front end portion of the down frame is joined to a lower portion of the head pipe.

In the vehicle body frame disclosed in the above-mentioned JP-A-2007-8434, the head pipe, the main frames and the down frame are firmly connected to each other by forming a truss. Accordingly, torsion and vibrations in the lateral direction from a front wheel are directly transmitted to a vehicle body frame side. Thus, it is necessary to increase the rigidity of whole vehicle body frame and the rigidity of mounting portions of parts or the like to be mounted on the vehicle body frame.

SUMMARY AND OBJECTS OF THE INVENTION

The present invention has been made under such circumstances, and it is an object of an embodiment of the present invention to provide a vehicle body frame of a motorcycle which makes it unnecessary to increase the rigidity of the whole vehicle body frame and the rigidity of mounting portions of parts or the like to be mounted on a vehicle body frame by suppressing the transmission of torsion and vibrations in the lateral direction from a front wheel to a vehicle body frame side.

To achieve the above-mentioned object, according to an embodiment of the present invention, in a vehicle body frame of a motorcycle which includes a head pipe which for steerably supporting a front fork which pivotally supports a front wheel and a steering handle, a pair of left and right main frames extend rearwardly and downwardly from the head pipe with a down frame extending rearwardly and downwardly from the head pipe at an angle steeper than an angle at which the main frames extend rearwardly and downwardly.

The head pipe includes, as integral parts thereof, a pipe portion which extends in the vertical direction, and a bracket portion which is contiguously formed on a rear portion of the pipe portion in a state where front end portions of the main frames are jointed to the bracket portion and a front end portion of the down frame is joined to bracket portion below the front end portions of the main frames.

The main frames are joined to the bracket portion in a state where a widthwise center line of the main frames in the vertical direction is directed toward an intermediate portion of the pipe portion in the vertical direction as viewed in a side view, and an upper surface extension line and a lower surface extension line which are on the extension in the frontward direction of an upper surface and a lower surface of the main frames pass between an upper end and a lower end of the pipe portion as viewed in a side view.

A front end portion of the down frame is inclined so as to be directed to the intermediate portion of the pipe portion in the vertical direction is joined to the bracket portion below the front end portions of the main frames as viewed in a side view.

According to an embodiment of the present invention, a main frame mounting portion which joins the front end portions of the pair of left and right main frames thereto from both left and right sides, and a reinforcing portion which is integrally and contiguously formed with an upper portion of the pipe portion and is arranged above the main frame mounting portion are integrally formed on the bracket portion.

The reinforcing portion is formed of a vertical rib having a triangular shape as viewed in a side view and a lateral rib which is contiguously formed with an upper portion of the vertical rib so as to extend in the lateral direction in a triangular shape having an apex at a front side thereof as viewed in a plan view.

According to an embodiment of the present invention, a tank support portion which supports a front portion of a fuel tank arranged between both main frames is integrally formed on an upper surface of the lateral rib.

According to an embodiment of the present invention, a damper mounting portion for mounting an upper end portion of a steering damper of a cylinder type which is provided between a bottom bridge of the front fork and the pipe portion of the head pipe is mounted on a front surface of the pipe portion in a state where the damper mounting portion is positioned on an extension line of the widthwise center line of the main frames in the vertical direction as viewed in a side view.

According to an embodiment of the present invention, a front end of the lateral rib is integrally and contiguously connected to a large-diameter portion of an upper end of the pipe portion.

According to an embodiment of the present invention, the main frames are joined to the bracket portion in a state where the widthwise center line of the main frames in the vertical direction is directed toward a center portion of the pipe portion in the vertical direction as viewed in a side view.

According to an embodiment of the present invention, the main frames and the down frame extend toward the intermediate portion of the pipe portion of the head pipe in the vertical direction and are joined to the bracket portion of the head pipe. Accordingly, when a vibration force in the lateral direction is applied to the head pipe from the front wheel, the head pipe is twisted about the intermediate portion of the pipe portion to which the main frames and the down frame are directed. Thus, a torsional force applied to the main frames and the down frame can be decreased whereby it is unnecessary to increase the rigidity of the main frames and the down frame and the rigidity of the mounting portion of an engine hanger or the like on a vehicle body frame. Further, the front end portions of the main frames can be arranged at a lower position compared to a case where the front end portions of the main frames are jointed to the upper portion of the head pipe. Thus, a distance between the front end portions of the main frames and a ground contact point of the front wheel can be made small thus decreasing the lateral vibrations which act on the head pipe from the front wheel.

According to an embodiment of the present invention, the reinforcing portion which is positioned above the main frame mounting portion and is integrally and contiguously formed with the upper portion of the pipe portion is integrally formed with the bracket portion, and the reinforcing portion is formed of the vertical rib having a triangular shape as viewed in a side view and the lateral rib which is contiguously formed with the upper portion of the vertical rib so as to extend in the lateral direction in a triangular shape having an apex at a front side thereof as viewed in a plan view. Accordingly, the rigidity of the joint portion between the head pipe and the main frames can be increased against a vibration force in the longitudinal direction and a vibration force in the lateral direction which act on the head pipe from the front wheel.

According to an embodiment of the present invention, the front end portions of the main frames are joined to the head pipe below the upper end of the head pipe. Accordingly, the fuel tank can be arranged in a space ensured above the main frame in a state where the front portion of the fuel tank is supported on the tank support portion which is integrally formed on the upper surface of the lateral rib of the reinforcing portion. Thus, a capacity of the fuel tank can be ensured.

According to an embodiment of the present invention, the damper mounting portion for mounting the upper end portion of the steering damper of a cylinder type which is provided between the bottom bridge of the front fork and the pipe portion of the head pipe is mounted on the front surface of the pipe portion in a state where the damper mounting portion is positioned on the extension line of the widthwise center line of the main frames in the vertical direction as viewed in a side view. Accordingly, the damper mounting portion is arranged at a position where the displacement is small with respect to twisting between the head pipe, the main frames and the down frame. Thus, a force of inertia applied to the steering damper can be decreased whereby it is unnecessary to increase the rigidity against the force of inertia.

According to an embodiment of the present invention, the front end of the lateral rib is integrally and contiguously formed with the large-diameter portion of the upper end of the pipe portion. Accordingly, the rigidity of the head pipe can be ensured by making use of the portion of the pipe portion which exhibits a high strength.

According to an embodiment of the present invention, the main frames are joined to the bracket portion in a state where the main frames are directed toward the center portion of the pipe portion of the head pipe in the vertical direction. Accordingly, when a vibration force in the lateral direction is applied to the head pipe from the front wheel, the head pipe is twisted about the center portion of the pipe portion in the vertical direction to which the main frames are directed. Thus, a torsional force applied to the main frame can be further decreased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
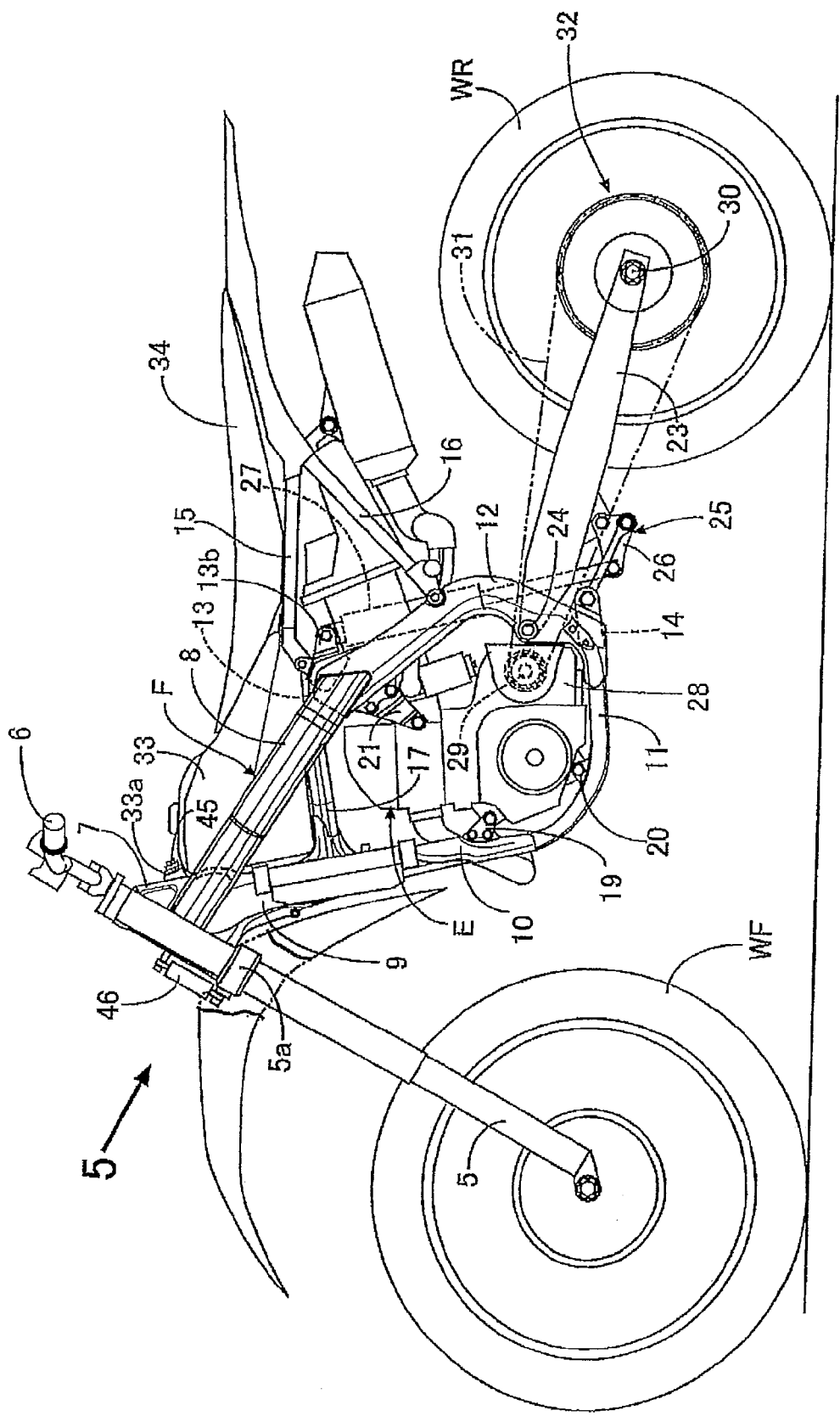
FIG. 1 is a side view of a motorcycle.
Figure 2:
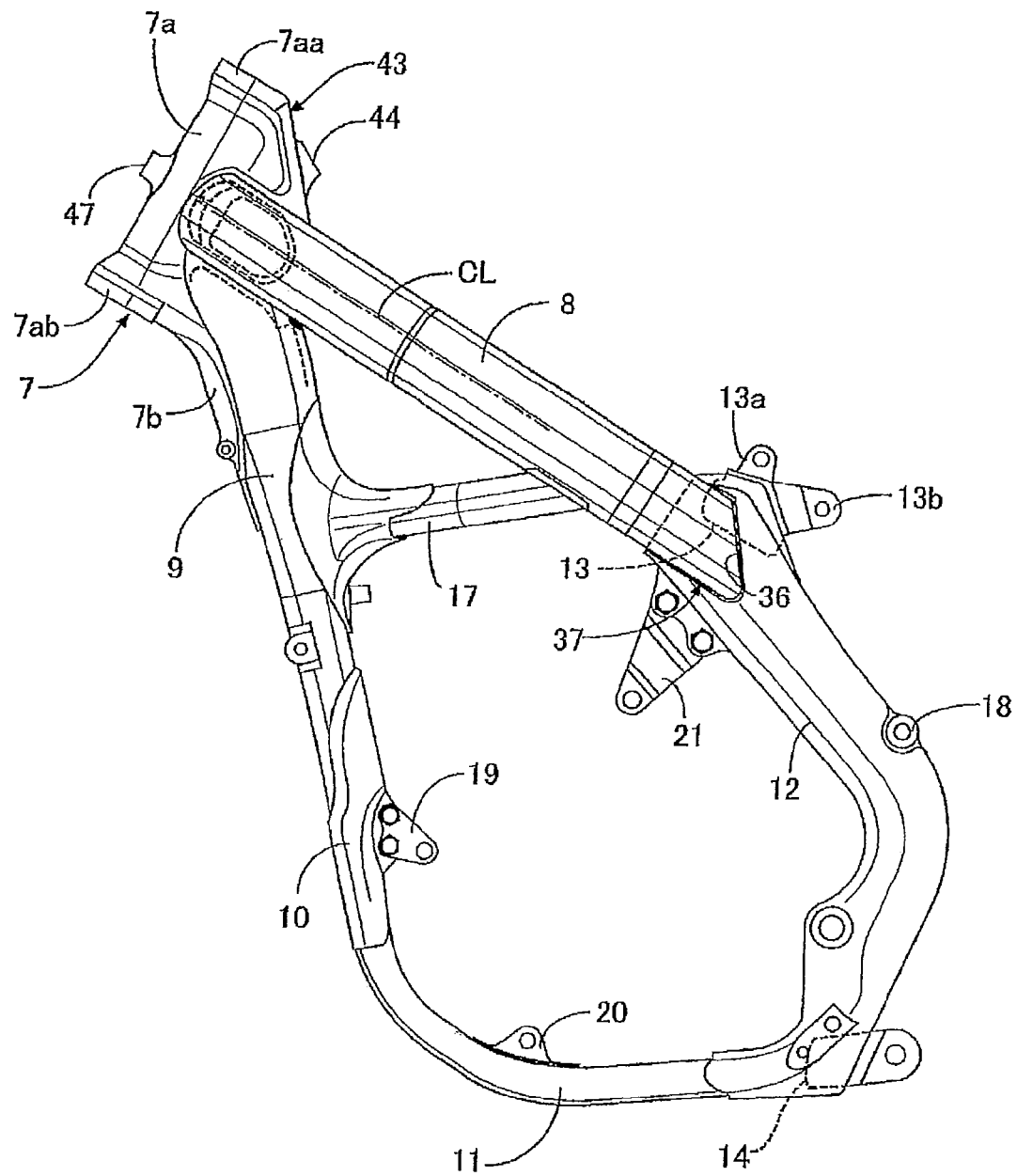
FIG. 2 is a side view showing a part of a vehicle body frame.

An embodiment of the present invention is explained in conjunction with FIG. 1 to FIG. 5. As illustrated in FIG. 1 and FIG. 2, a motorcycle according to this embodiment is a motorcycle for motocross competition, wherein a vehicle body frame F of the motorcycle includes a head pipe 7 for steerably supporting a front fork 5 for pivotally supporting a front wheel WF and a bar-shaped steering handle 6. A pair of left and right main frames 8 . . . extend rearwardly and downwardly from the head pipe 7 with a down frame 9 extending rearwardly and downwardly from the head pipe at an angle steeper than an angle at which the main frames 8 . . . extend rearwardly and downwardly. A pair of left and right lower frames 11 . . . is contiguously formed on a lower end portion of the down frame 9 by way of a joint 10 and extend rearwardly. A pair of left and right pivot plates 12 . . . , which include upper end portions thereof joined to rear end portions of the main frames 8 . . . , extends downwardly, and has lower end portions thereof on which rear end portions of both lower frames 11 . . . are contiguously formed. An upper cross member 13 is provided between the upper end portions of the pivot plates 12 with a lower cross member 14 being provided between the lower end portions of both pivot plates 12 . . . . A pair of left and right seat rails 15 . . . , which include front end portions thereof connected to the upper cross member 13, extend rearwardly. A pair of left and right rear frames 16 . . . connect intermediate portions of both pivot plates 12 . . . in the vertical direction and rear portions of both seat rails 15 . . . . An approximately U-shaped reinforcing frame 17 connects a lower portion of the down frame 9 and both main frames 8 . . . .

The pivot plates 12 . . . are formed in a vertically extending manner in a state where intermediate portions of the pivot plates 12 . . . in the vertical direction are curved in a rearwardly projecting manner, and front portions of the rear frames 16 . . . are connected to rear frame connection portions 18 . . . which are mounted on the intermediate portions of the pivot plates 12 . . . in the vertical direction.

An engine E is arranged in a space surrounded by the main frames 8 . . . , the down frame 9, the joint 10, the lower frames 11 . . . , and the pivot plates 12 . . . . A front portion of the engine E is supported on the joint 10 by way of a first engine hanger 19, a lower portion of the engine E is supported on second engine hangers 20 . . . which are mounted on the lower frames 11 . . . , and an upper portion of the engine E is supported on upper portions of the pivot plates 12 . . . by way of third engine hangers 21 . . . .

A front end portion of a swing arm 23 which pivotally supports a rear wheel WR on a rear end portion thereof is supported on lower portions of the pivot plates 12 . . . in a vertically swingable manner by way of a support shaft 24 with a link mechanism 25 being arranged between the lower cross member 14 and the swing arm 23. A shock absorber 27 is arranged between a link member 26 which constitutes a part of the link mechanism 25 and the upper cross member 13.

A transmission not shown in the drawing is housed in the inside of a crankcase 28 included in the engine E with an output shaft 29 of the transmission projecting leftwardly from the crankcase 28, and a power transmission unit 32 which uses an endless chain 31 being arranged between the output shaft 29 and an axle 30 of the rear wheel WR.

Further, a fuel tank 33 is arranged on both main frames 8 . . . above the engine E, and a riding seat 34 is arranged behind the fuel tank 33 in a state where the riding seat 34 is supported on the seat rails 15 . . . .

The upper end portions of the pair of left and right pivot plates 12 . . . are joined to rear end portions of the pair of left and right main frames 8 . . . from the inside in the vehicle widthwise direction. Recessed portions 36 . . . into which rear end portions of the main frames 8 . . . are fitted are formed on outer surfaces of the upper end portions of the pivot plates 12 . . . . In a state where the rear end portions of the main frames 8 . . . are fitted into the joining recessed portions 36 . . . , the rear end portions of the main frames 8 . . . and the upper end portions of the pivot plates 12 . . . are joined to each other by welding.

Connection projecting portions 12a . . . project inwardly in the vehicle widthwise direction are integrally formed on the upper end portions of the pivot plates 12 . . . , and both end portions of the upper cross member 13 are joined to the connection projecting portions 12a . . . of both pivot plates 12 . . . by welding.

A pair of left and right seat rail mounting portions 13a, 13a is integrally formed on an upper portion of the upper cross member 13 in an upwardly projecting manner, and front end portions of the seat rails 15 . . . are connected to the seat rail mounting portions 13a, 13a. Damper mounting portions 13b, 13b are integrally formed on a rear portion of the upper cross member 13 in a rearwardly projecting manner, and an upper end portion of the damper 27 is connected to the damper mounting portions 13b . . . .

Figure 3:
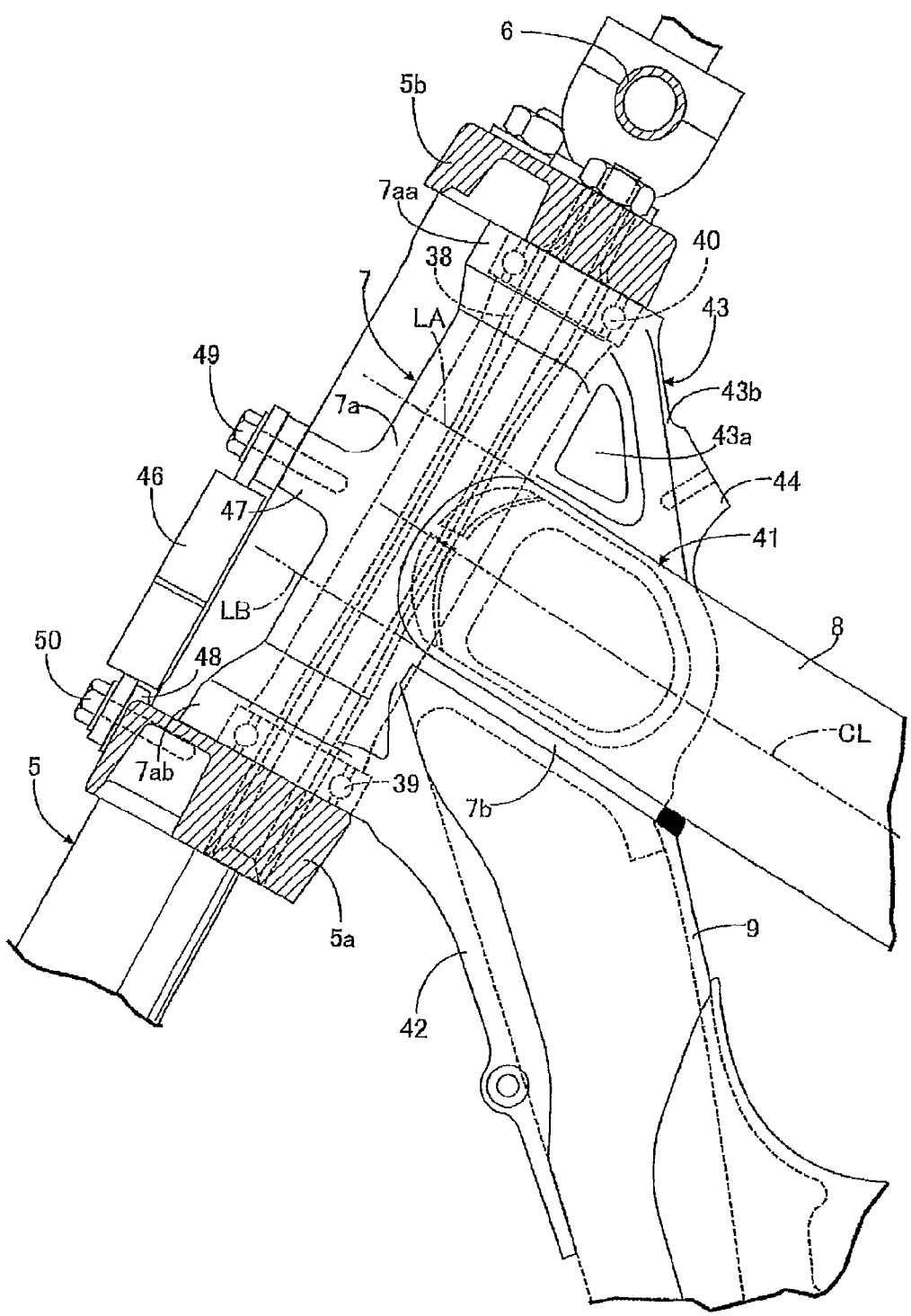
FIG. 3 is a vertical cross-sectional side view with a part broken away showing joint portions between a head pipe, main frames and down frame in an enlarged manner.
Figure 4:
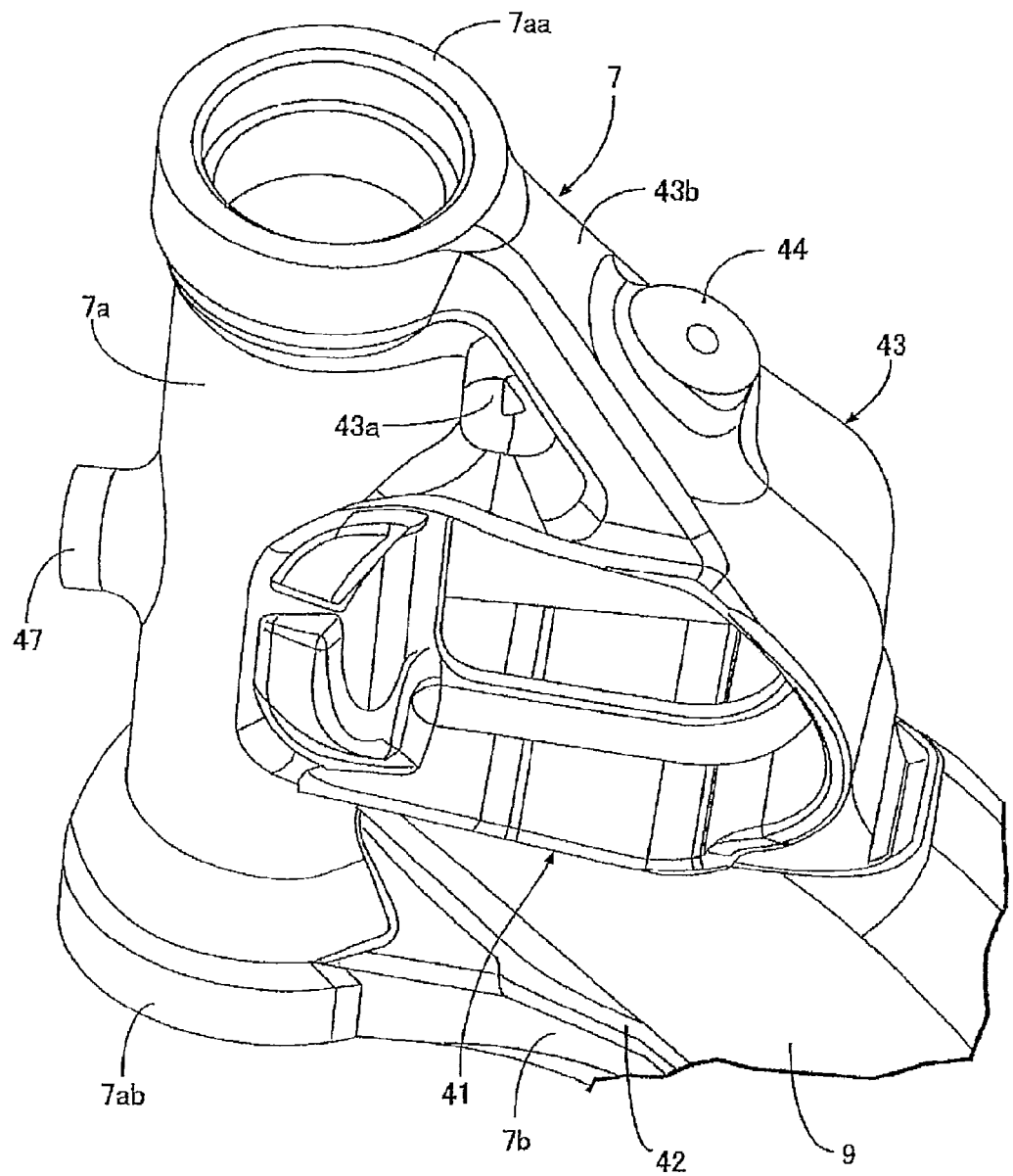
FIG. 4 is a perspective view showing a part of the down frame and the head pipe.

As shown in FIG. 3 and FIG. 4, the head pipe 7 includes, as integral parts thereof, a pipe portion 7a extending in the vertical direction, and a bracket portion 7b which is contiguously connected to a rear portion of the pipe portion 7a in a state where front end portions of the main frames 8 . . . are joined to the bracket portion 7b with a front end portion of the down frame 9 being joined to the bracket portion 7b below the front end portions of the main frames 8. Large-diameter portions 7aa, lab are formed on an upper end and a lower end of the pipe portion 7a respectively.

A bottom bridge 5a and a top bridge 5b of the front fork 5 are arranged so as to sandwich the pipe portion 7a of the head pipe 7 from above and below. A steering stem 38 connecting a vehicle-width-direction center portion of the bottom bridge 5a and a vehicle-width-direction center portion of the top bridge 5b to each other passes through the pipe portion 7a with bearings 39, 40 being interposed between the steering stem 38 and the pipe portion 7a. Further, the steering handle 6 is connected to the top bridge 5b of the front fork 5.

A main frame mounting portion 41 which joins front end portions of the pair of left and right main frames 8 . . . thereto from both left and right sides is integrally formed with a vertically intermediate portion of the bracket portion 7b in a state where the main frame mounting portion 41 opens in both leftward and rightward directions of the bracket portion 7b. The main frames 8 . . . are joined to the main frame mounting portion 41 of the bracket portion 7b in a state where a widthwise center line CL of the main frames 8 in the vertical direction is directed toward a vertically intermediate portion, desirably a vertically center portion of the pipe portion 7a as viewed in a side view. An upper surface extension line LA and a lower surface extension line LB which are on the extension in the frontward direction of an upper surface and a lower surface of the main frames 8 . . . pass between an upper end and a lower end of the pipe portion 7a as viewed in a side view.

Further, below the main frame mounting portion 41, a down frame mounting portion 42 which joins a front end portion of the down frame 9 thereto from below is integrally formed on the bracket portion 7b. The front end portion of the down frame 9, inclined so as to be directed toward an intermediate portion of the pipe portion 7a in the vertical direction, is joined to the down frame mounting portion 42 of the bracket portion 7b below the front end portions of the main frames 8 as viewed in a side view.

A reinforcing portion 43, integrally and contiguously formed with an upper portion of the pipe portion 7a, is arranged above the main frame mounting portion 41 and is integrally formed with the bracket portion 7b. The reinforcing portion 43 is formed of a vertical rib 43a having a triangular shape as viewed in a side view and a lateral rib 43b which is contiguously formed with an upper portion of the vertical rib 43b so as to extend in the lateral direction in a triangular shape having an apex at a front side thereof as viewed in a plan view. A front end of the lateral rib 43b is integrally and contiguously connected to the large-diameter portion 7aa at the upper end of the pipe portion 7a.

A tank support portion 44 which supports a front portion of the fuel tank 33 arranged between both main frames 8 . . . is integrally formed on an upper surface of the lateral rib 43b in a projecting manner. A mounting plate portion 33a is mounted on a front portion of the fuel tank 33 and is fastened to the tank support portion 44 by bolts 45 (see FIG. 1).

Figure 5:
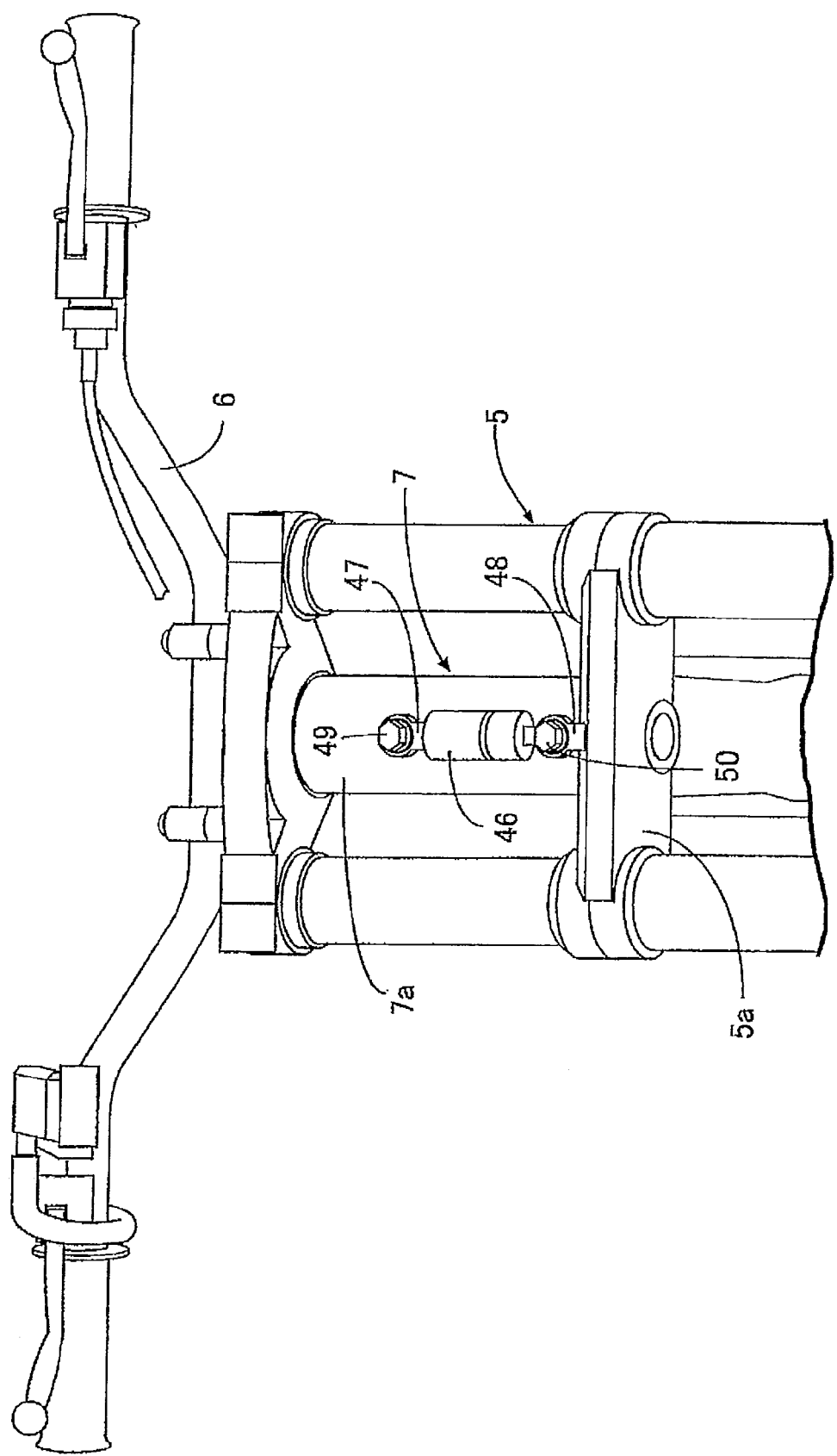
FIG. 5 is a view of the motorcycle as viewed in the direction indicated by an arrow 5 in FIG. 1.

To further explain this embodiment also in conjunction with FIG. 5, a steering damper 46 of a cylinder type is provided between the bottom bridge 5a of the front fork 5 and the pipe portion 7a of the head pipe 7. A damper mounting portion 47 which mounts an upper end portion of the steering damper 46 thereon is mounted on a front surface of the pipe portion 7a in a state where the damper mounting portion 47 is positioned on an extension line of the widthwise center line CL of the main frames 8 . . . in the vertical direction as viewed in a side view. A damper mounting portion 48 which mounts a lower end portion of the steering damper 46 thereon is mounted on a front surface of the bottom bridge 5a. The upper end portion and the lower end portion of the steering damper 46 are mounted on the damper mounting portions 47, 48 by bolts 49, 50.

To explain the manner of operation of this embodiment, the head pipe 7 includes, as integral parts thereof, the pipe portion 7a extending vertically in a state where the steering stem 38, which is contiguously connected to the front fork 5 and the steering handle 6, passes through the pipe portion 7a in a rotatable manner, and the bracket portion 7b which is contiguously connected to the rear portion of the pipe portion 7a in a state where the front end portions of the main frames 8 . . . are joined to the bracket portion 7b and the front end portion of the down frame 9 is joined to the bracket portion 7b below the front end portions of the main frames 8 . . . . The main frames 8 . . . are joined to the bracket portion 7b in a state where the widthwise center line CL of the main frames 8 . . . in the vertical direction is directed toward the vertically intermediate portion, desirably the vertically center portion of the pipe portion 7a as viewed in a side view, and the upper surface extension line LA and the lower surface extension line LB which are on the extension in the frontward direction of the upper surface and the lower surface of the main frames 8 . . . pass between the upper end and the lower end of the pipe portion 7*a* as viewed in a side view. The front end portion of the down frame 9 which is inclined so as to be directed towards the intermediate portion of the pipe portion 7*a* in the vertical direction is joined to the bracket portion 7*b* below the front end portions of the main frames 8 . . . as viewed in a side view.

Accordingly, when a vibration force in the lateral direction is applied to the head pipe 7 from the front wheel WF, the head pipe 7 is twisted about the intermediate portion of the pipe portion 7*a* to which the main frames 8 . . . and the down frame 9 are directed. Thus, a torsional force applied to the main frames 8 . . . and the down frame 9 can be decreased whereby it is unnecessary to increase the rigidity of the main frames 8 . . . and the down frame 9 and the rigidity of the mounting portions of the engine hangers 19 to 21 or the like on the vehicle body frame F. Further, when the widthwise center line CL of the main frames 8 . . . in the vertical direction is directed toward the center portion of the pipe portion 7*a* in the vertical direction as viewed in a side view, a torsional force applied to the main frames 8 . . . can be further decreased. Further, the front end portions of the main frames 8 . . . are arranged at a lower position compared to a case where the front end portions of the main frames 8 . . . are jointed to the upper portion of the head pipe 7. Thus, a distance between the front end portions of the main frames 8 . . . and a ground contact point of the front wheel WF can be made small thus decreasing the lateral vibrations which act on the head pipe 7 from the front wheel WF.

Further, the main frame mounting portion 41 which joins the front end portions of the pair of left and right main frames 8 . . . thereto from both left and right sides and the reinforcing portion 43 which is integrally and contiguously formed with the upper portion of the pipe portion 7*a* and is arranged above the main frame mounting portion 41 are integrally formed on the bracket portion 7*b*. The reinforcing portion 43 is formed of the vertical rib 43*a* having a triangular shape as viewed in a side view and the lateral rib 43*b* which is contiguously formed with the upper portion of the vertical rib 43*a* so as to extend in the lateral direction in a triangular shape having an apex at a front side thereof as viewed in a plan view. Thus, the rigidity of the joint portions between the head pipe 7 and the main frames 8 . . . against a vibration force in the longitudinal direction as well as in the lateral direction which acts on the head pipe 7 from the front wheel WF can be increased.

Further, the front end of the lateral rib 43*b* is integrally and contiguously connected to the large-diameter portion 7*aa* of the upper end of the pipe portion 7*a*. Thus, the rigidity of the head pipe 7 can be ensured by making use of the portion of the pipe portion 7*a* which exhibits a high strength.

The front end portions of the main frames 8 . . . are joined to the head pipe 7 below the upper end of the head pipe 7 so that the space can be ensured above the main frames 8 . . . . In addition, the fuel tank 33 can be arranged in the space in a state where the front portion of the fuel tank 33 is supported on the tank support portion 44 which is integrally formed on the upper surface of the lateral rib 43*b* of the reinforcing portion 43 and hence, a capacity of the fuel tank 33 can be ensured.

Further, the damper mounting portion 47 for mounting the upper end portion of the steering damper 46 of a cylinder type which is provided between the bottom bridge 5*a* of the front fork 5 and the pipe portion 7*a* of the head pipe 7 is mounted on the front surface of the pipe portion 7*a* in a state where the damper mounting portion 47 is positioned on the extension line in the widthwise center line CL of the main frames 8 . . . in the vertical direction as viewed in a side view. Accordingly, the damper mounting portion 47 is arranged at a position where the displacement is small with respect to twisting between the head pipe 7, the main frames 8 . . . and the down frame 9. Thus, a force of inertia applied to the steering damper 46 can be decreased whereby it is unnecessary to increase the rigidity against the force of inertia.

Although the embodiment of the present invention has been explained heretofore, the present invention is not limited to the above-mentioned embodiment, and various design modifications are conceivable without departing from the present invention described in claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body frame of a motorcycle comprising:
   a head pipe for steerably supporting a front fork for pivotally supporting a front wheel and a steering handle;
   a pair of left and right main frames extending rearwardly and downwardly from the head pipe; and
   a down frame extending rearwardly and downwardly from the head pipe at an angle steeper than an angle at which the main frames extend rearwardly and downwardly;
   wherein the head pipe includes, as integral parts thereof, a pipe portion extending in a first upward direction, and a bracket portion which is contiguously formed on a rear portion of the pipe portion in a state where front end portions of the main frames are jointed to the bracket portion and a front end portion of the down frame is joined to the bracket portion below the front end portions of the main frames;
   the main frames are joined to the bracket portion in a state where a widthwise center line of the main frames in a second upward direction is directed towards an intermediate portion of the pipe portion in the first upward direction as viewed in a side view, and an upper surface extension line and a lower surface extension line which are on an extension in a frontward direction of an upper surface and a lower surface of the main frames pass between an upper end and a lower end of the pipe portion as viewed in a side view; and
   a front end portion of the down frame, inclined so as to be directed to the intermediate portion of the pipe portion in the first upward direction, is joined to the bracket portion below the front end portions of the main frames as viewed in a side view.

2. The vehicle body frame of a motorcycle according to claim 1, wherein a main frame mounting portion for joining the front end portions of the pair of left and right main frames thereto from both left and right sides, and a reinforcing portion, integrally and contiguously formed with an upper portion of the pipe portion and arranged above the main frame mounting portion, are integrally formed on the bracket portion, and
   the reinforcing portion is formed of a vertical rib having a triangular shape as viewed in a side view and a lateral rib which is contiguously formed with an upper portion of the vertical rib so as to extend in the lateral direction in a triangular shape having an apex at a front side thereof as viewed in a plan view.

3. The vehicle body frame of a motorcycle according to claim 2, wherein a tank support portion supports a front portion of a fuel tank arranged between both main frames is integrally formed on an upper surface of the lateral rib.

4. The vehicle body frame of a motorcycle according to claim 3, wherein a damper mounting portion for mounting an upper end portion of a steering damper of a cylinder type, which is provided between a bottom bridge of the front fork and the pipe portion of the head pipe, is mounted on a front surface of the pipe portion in a state where the damper mounting portion is positioned on an extension line of the widthwise center line of the main frames in the second upward direction as viewed in a side view.

5. The vehicle body frame of a motorcycle according to claim 2, wherein a damper mounting portion for mounting an upper end portion of a steering damper of a cylinder type, which is provided between a bottom bridge of the front fork and the pipe portion of the head pipe, is mounted on a front surface of the pipe portion in a state where the damper mounting portion is positioned on an extension line of the widthwise center line of the main frames in the second upward direction as viewed in a side view.

6. The vehicle body frame of a motorcycle according to claim 2, wherein a front end of the lateral rib is integrally and contiguously connected to a large-diameter portion of an upper end of the pipe portion.

7. The vehicle body frame of a motorcycle according to claim 1, wherein a damper mounting portion for mounting an upper end portion of a steering damper of a cylinder type, which is provided between a bottom bridge of the front fork and the pipe portion of the head pipe, is mounted on a front surface of the pipe portion in a state where the damper mounting portion is positioned on an extension line of the widthwise center line of the main frames in the second upward direction as viewed in a side view.

8. The vehicle body frame of a motorcycle according to claim 1, wherein the main frames are joined to the bracket portion in a state where the widthwise center line of the main frames in the second upward direction is directed toward a center portion of the pipe portion in the first upward direction as viewed in a side view.

9. The vehicle body frame of a motorcycle according to claim 1, and further including large diameter portions on an upper and a lower end of the pipe portion for mounting bearings interposed between a steering stem and the pipe portion.

10. The vehicle body frame of a motorcycle according to claim 1, and further including a U-shaped reinforcing frame for connecting a lower portion of the down frame and the main frames, said U-shaped reinforcing frame being displaced rearwardly and downwardly a predetermined distance from the head pipe.

11. A vehicle body frame of a motorcycle comprising:
a head pipe;
a pair of left and right main frames extending rearwardly and downwardly from the head pipe at a predetermined angle; and
a down frame extending rearwardly and downwardly from the head pipe at a predetermined angle that is steeper relative to the predetermined angle at which the main frames extend rearwardly and downwardly;
said head pipe including, as integral parts thereof, a pipe portion extending in a first upward direction, and a bracket portion contiguously formed on a rear portion of the pipe portion wherein front end portions of the main frames are jointed to the bracket portion and a front end portion of the down frame is joined to the bracket portion below the front end portions of the main frames;
said main frames being joined to the bracket portion wherein a widthwise center line of the main frames in a second upward direction is directed towards an intermediate portion of the pipe portion in the first upward direction as viewed in a side view, and an upper surface extension line and a lower surface extension line which are on the extension in the frontward direction of an upper surface and a lower surface of the main frames pass between an upper end and a lower end of the pipe portion as viewed in a side view; and
a front end portion of the down frame, inclined so as to be directed to the intermediate portion of the pipe portion in the first upward direction, is joined to the bracket portion below the front end portions of the main frames as viewed in a side view.

12. The vehicle body frame of a motorcycle according to claim 11, wherein a main frame mounting portion for joining the front end portions of the pair of left and right main frames thereto from both left and right sides, and a reinforcing portion, integrally and contiguously formed with an upper portion of the pipe portion and arranged above the main frame mounting portion, are integrally formed on the bracket portion, and
the reinforcing portion is formed of a vertical rib having a triangular shape as viewed in a side view and a lateral rib which is contiguously formed with an upper portion of the vertical rib so as to extend in the lateral direction in a triangular shape having an apex at a front side thereof as viewed in a plan view.

13. The vehicle body frame of a motorcycle according to claim 12, wherein a tank support portion supports a front portion of a fuel tank arranged between both main frames is integrally formed on an upper surface of the lateral rib.

14. The vehicle body frame of a motorcycle according to claim 13, wherein a damper mounting portion for mounting an upper end portion of a steering damper of a cylinder type, which is provided between a bottom bridge of the front fork and the pipe portion of the head pipe, is mounted on a front surface of the pipe portion in a state where the damper mounting portion is positioned on an extension line of the widthwise center line of the main frames in the second upward direction as viewed in a side view.

15. The vehicle body frame of a motorcycle according to claim 12, wherein a damper mounting portion for mounting an upper end portion of a steering damper of a cylinder type, which is provided between a bottom bridge of the front fork and the pipe portion of the head pipe, is mounted on a front surface of the pipe portion in a state where the damper mounting portion is positioned on an extension line of the widthwise center line of the main frames in the second upward direction as viewed in a side view.

16. The vehicle body frame of a motorcycle according to claim 12, wherein a front end of the lateral rib is integrally and contiguously connected to a large-diameter portion of an upper end of the pipe portion.

17. The vehicle body frame of a motorcycle according to claim 11, wherein a damper mounting portion for mounting an upper end portion of a steering damper of a cylinder type, which is provided between a bottom bridge of the front fork and the pipe portion of the head pipe, is mounted on a front surface of the pipe portion in a state where the damper mounting portion is positioned on an extension line of the widthwise center line of the main frames in the second upward direction as viewed in a side view.

18. The vehicle body frame of a motorcycle according to claim 11, wherein the main frames are joined to the bracket portion wherein the widthwise center line of the main frames in the second upward direction is directed toward a center portion of the pipe portion in the first upward direction as viewed in a side view.

19. The vehicle body frame of a motorcycle according to claim 11, and further including large diameter portions on an upper and a lower end of the pipe portion for mounting bearings interposed between a steering stem and the pipe portion.

20. The vehicle body frame of a motorcycle according to claim 11, and further including a U-shaped reinforcing frame for connecting a lower portion of the down frame and the main frames, said U-shaped reinforcing frame being displaced rearwardly and downwardly a predetermined distance from the head pipe.

* * * * *